J. P. WRIGHT.
MACHINE FOR FORMING BOX SHUCKS.
APPLICATION FILED JAN. 17, 1902. RENEWED NOV. 7, 1911.

1,016,465.

Patented Feb. 6, 1912.

6 SHEETS—SHEET 2.

J. P. WRIGHT.
MACHINE FOR FORMING BOX SHUCKS.
APPLICATION FILED JAN. 17, 1902. RENEWED NOV. 7, 1911.

1,016,465.

Patented Feb. 6, 1912.

6 SHEETS—SHEET 6.

Witnesses:
Jas. E. Hutchinson
F. R. Fitton

Inventor:
Jacob P. Wright
By John R. Nolan
Attorney

UNITED STATES PATENT OFFICE.

JACOB P. WRIGHT, OF AKRON, OHIO, ASSIGNOR TO THE DIAMOND MATCH COMPANY, OF NEW YORK, N. Y., A CORPORATION OF ILLINOIS.

MACHINE FOR FORMING BOX-SHUCKS.

1,016,465. Specification of Letters Patent. Patented Feb. 6, 1912.

Application filed January 17, 1902, Serial No. 90,175. Renewed November 7, 1911. Serial No. 659,057.

*To all whom it may concern:*

Be it known that I, JACOB P. WRIGHT, of Akron, in the county of Summit and in the State of Ohio, have invented certain new and useful Improvements in Machines for Forming Box-Shucks, and do hereby declare that the following is a full, clear, and exact description thereof, reference being had to the accompanying drawings, in which—

Figure 1:
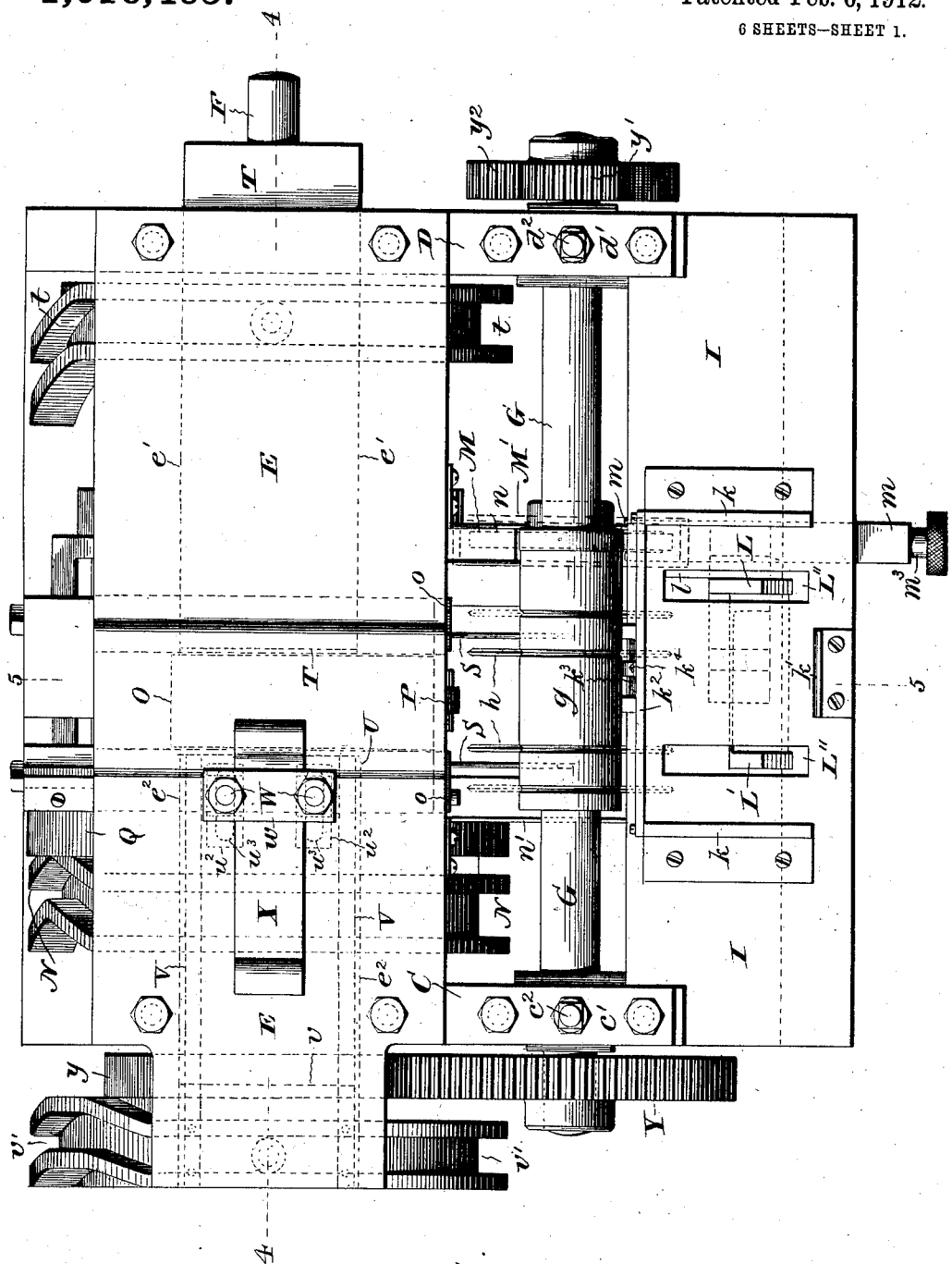
Figure 2:
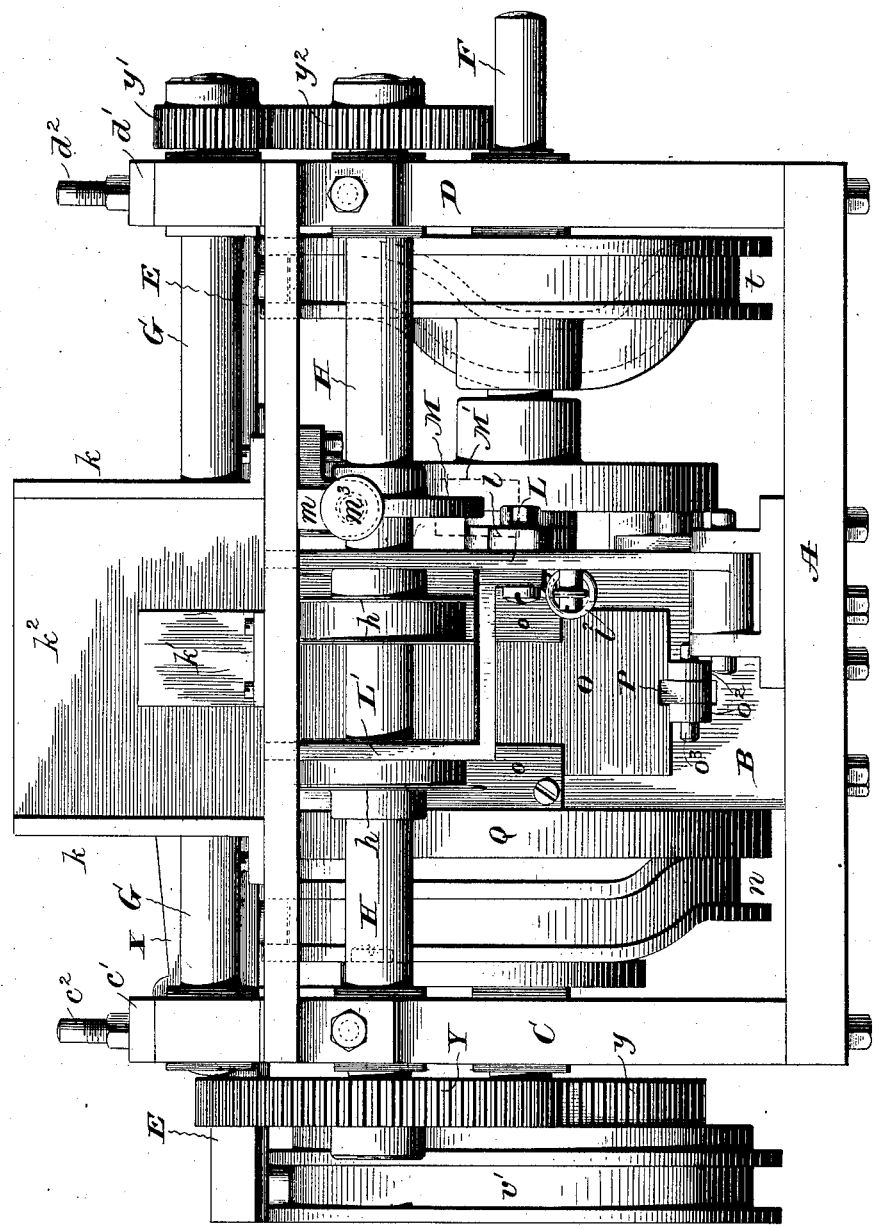
Figure 3:
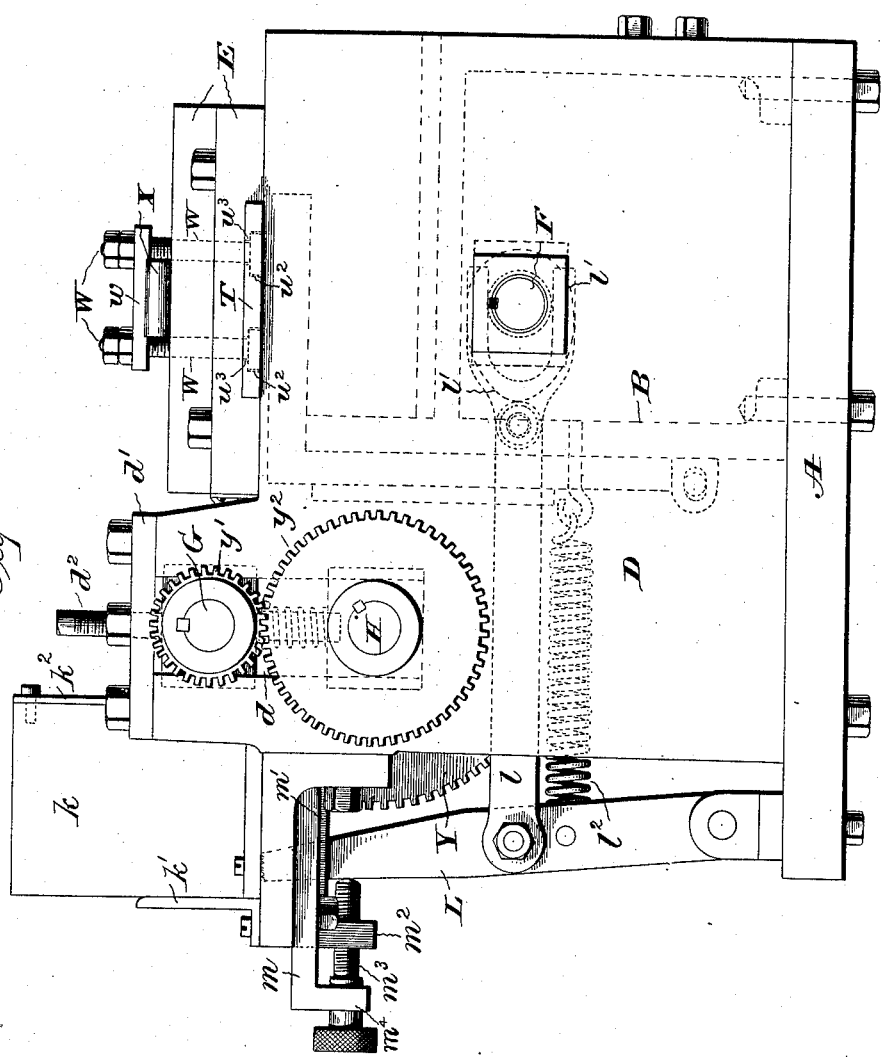
Figure 4:
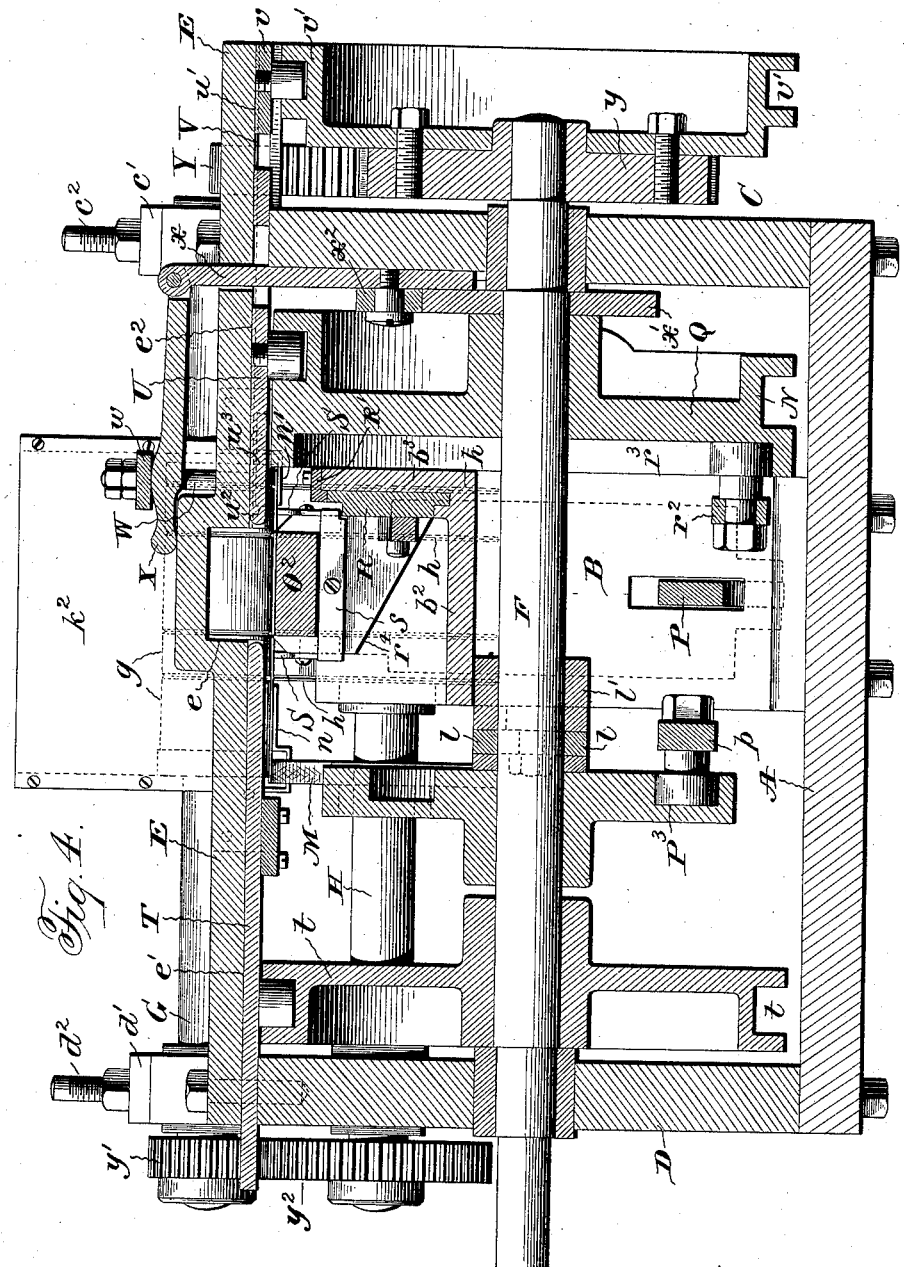
Figure 5:
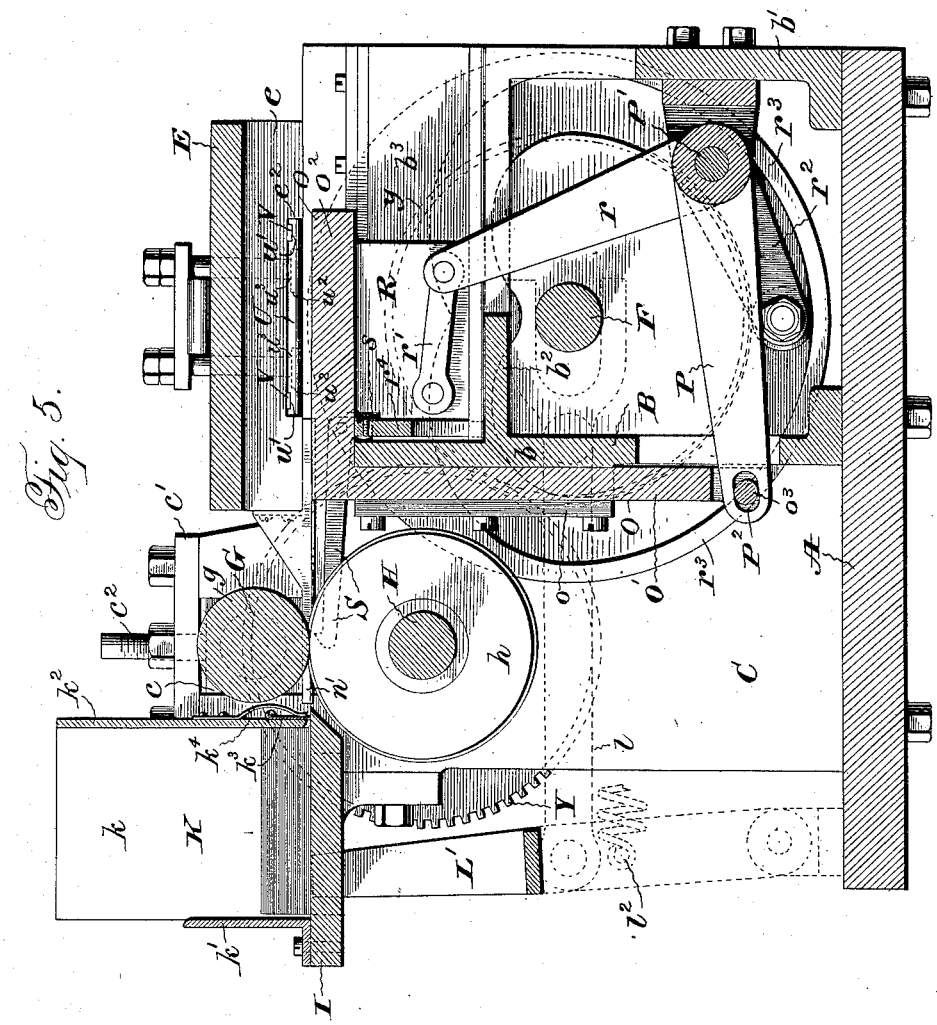
Figure 6:
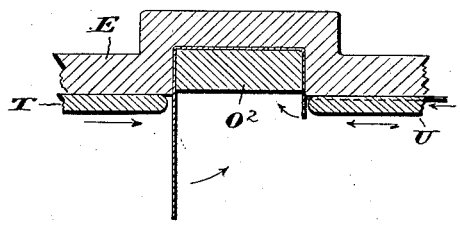
Figure 7:
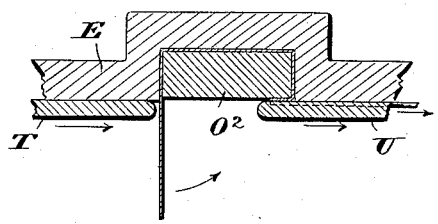
Figure 8:
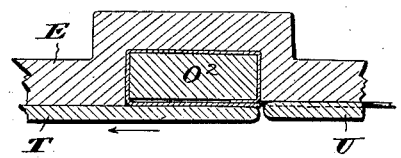
Figure 9:
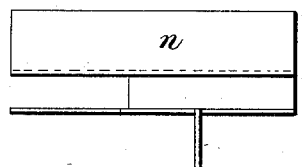
Figure 10:
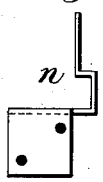
Figure 12:
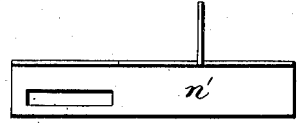
Figure 13:
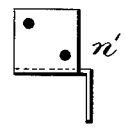
Figure 11:
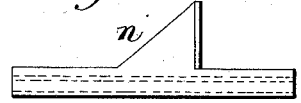
Figure 14:
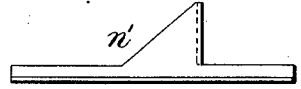

Figure 1 is a plan view of a machine embodying my invention; Fig. 2 is a front elevation; Fig. 3 is a right side elevation of the machine illustrated in Fig. 1; Figs. 4 and 5 are, respectively, vertical, transverse and longitudinal sectional views taken on the lines 4—4 and 5—5 of Fig. 1, the direction of view in Fig. 4 being from the rear toward the front of the machine. Figs. 6, 7 and 8 are fragmentary sectional views illustrating various steps in the operation of folding the shuck. Figs. 9 to 14, inclusive, are detail views illustrating the construction of the guides for the shuck blanks in their passage from the chute to the folding mechanism.

Letters of like name and kind refer to like parts in each of the figures.

The object of my invention has been to provide a machine by which shucks for boxes, such as cigarette and match boxes, can be cheaply and accurately formed, and in which material having a fine finish upon its surface can be used without injury to such surface, and to such ends, my invention consists in the machine hereinafter specified.

Throughout the specification, the terms "right" and "left" are mere terms of relation, and are used to enable the elements of construction being more readily described with respect to the machine structure as an entirety. The position contemplated thereby is based upon the assumption that the machine is viewed from its front, as in Figs. 1 and 2.

In carrying my invention into practice, I provide a bed plate A to which is secured a frame B, the latter being preferably formed in a single casting, and consisting of a front plate $b$ and a rear plate $b'$, such plates being connected by a horizontal web $b^2$, from which rises a vertical web $b^3$. The rear plate preferably does not rise above the horizontal web, but the upper edge of the front plate and vertical web are at the same level. Right and left side plates D and C, respectively, are secured to the bed plate at the ends thereof, and a top plate E extends across the frame B, to which it is secured, and has its ends secured to the upper edges of the side plates C and D. Rectangular openings are formed in the side plates C and D, for the reception of bearing boxes of the cam shaft F. The said boxes preferably have rectangular bodies which fit into the said openings, and are provided with flanges which bear against the inner faces of the side plates. Vertical slots $c$ and $d$ are formed in the side plates, forward of the frame B for the reception of the bearing boxes of upper and lower feed roller shafts G and H, respectively, the said boxes being constructed similarly to those of the cam shaft. The upper ends of the slots are spanned by bars $c'$ and $d'$, in which are threaded screws $c^2$ and $d^2$ that are adapted to bear upon the upper bearing boxes and force them toward the lower bearing boxes. Coiled springs one being shown in dotted lines in Fig. 3 tend to hold the upper boxes away from the lower boxes, such springs being mounted upon pins that are secured preferably in the upper boxes and are received in guiding openings in the lower boxes.

Upon the forward edges of the sides C and D, a table I is secured by brackets formed on said table. The said table supports a chute K which is for the reception of the blanks from which the shucks are to be formed. The said chute consists of side plates $k$ and $k$ that are secured to the table, and of front and rear plates $k'$ and $k^2$, respectively. The front plate is supported on the table, and is preferably narrower than the distance between the side plates, so as to leave room for reaching the blanks in the chute. The upper edge of such plate is preferably beveled and does not extend to the top of the chute. The rear plate is secured to the side plates and terminates at a distance slightly above the table, the latter forming the bottom of the chute. A gate $k^3$ is horizontally hinged upon the lower portion of the rear plate of the chute, and extends nearly or quite to the upper surface of the table. A spring $k^4$ is secured upon the plate $k^2$, and bears upon the rear face of the gate to hold the latter against the plate $k^2$. Blank feeding dogs L and L' are pivoted upon the bed plate and extend upward through slots L'', clearly shown in Fig. 1 in the table in position to engage the under face of a lowermost blank. The dog L' is preferably attached to the dog L by a horizontally extending arm having an ear that is fastened to the latter dog, and the dog L is pivoted between ears that are secured upon the bed plate. The dogs are oscillated by a bar $l$ that is pivoted to the said dogs and has its rearmost end forked and embracing the cam shaft F. The bar $l$ carries a roller which engages the face of a cam $l'$ on the cam shaft see Figs. 4 and 5, the roller being kept in contact with the said cam by a spring $l^2$, whose forward end is secured to the dog L, and whose rearward end engages a hook, or other form of attachment, on the frame B.

On the shaft H are mounted scoring disks $h$ and $h$, preferably four in number, the said disks co-acting with a roller $g$ mounted upon the shaft G, the roller having grooves opposite the said disks. The disks and grooves are so placed as to form their scores upon the blank at the desired distances apart, so that, when folded, the blank will form a shuck of the desired cross section. Upon the shaft H is mounted a glue wheel M, which is supplied from a glue pot M' conventionally shown by dotted lines, and which may be of any approved construction, said wheel being in position to engage the right-hand edge of the blank. A scraper $m$ is mounted on the under side of the table in a guide way formed in a block $m'$ that is secured to the table, see Figs. 1, 2 and 3. The said block has a lug $m^2$ which depends therefrom and in which is threaded a thumb screw $m^3$ that is swiveled in a forked lug $m^4$ depending from the scraper. The forward end of the scraper is forked to engage the sides of the glue wheel and to scrape the desired amount of glue from the face of the glue wheel. By turning the thumb screw, the scraper can be made to approach or recede from the face of the glue wheel. Right and left guides $n$ and $n'$, Figs. 1 and 5 extend forwardly from the front edge of the plate E, which guides terminate at a point immediately in rear of the chute K, the said guides being secured by ears to the forward face of the top plate E. The said guides consist preferably of sheet metal bent to form horizontal ledges and vertical sides, and they extend past the ends of the scoring roll and disks and support and guide the blanks in their passage from the chute through the scoring mechanism to the forming mechanism.

A former O is provided, which is of inverted L shape and consists of a vertical shank O', from whose upper end extends a horizontal forming arm $O^2$. The said shank is guided between ribs formed on the front face of the frame B, and is held in such guide way by plates $o$ that are secured to the front sides of said ribs and arranged to overlap the edges of the shank O'. At its lower end, the shank of the former is provided with ears $o^2$ which receive a pin $o^3$ that is engaged by a lever P. The said lever is mounted upon a shaft P' that is arranged in forwardly projecting lugs secured to the rear plate of the frame B, and said lever is provided with an elongated slot $P^2$ which receives the pin $o^3$ to permit the swinging movement of the lever to impart a right line movement to the former. An arm $p$ is also mounted upon the shaft P', on whose outer end is mounted a cam roll that engages a cam $P^3$ formed in the side of a cam body mounted on the cam shaft. The construction of the former and its operating mechanism is clearly seen in Figs. 2, 4 and 5.

The upper face of the table, the plane of meeting of the scorer roll and disks, and the upper face of the former arm, when the latter is in its lowest position, are substantially in the same plane. The top plate E is arched upward, and is provided with a rectangular recess $e$ above the former arm, into which recess the former arm is adapted to force the blank, said recess serving as a matrix with which the former O coöperates. A slide R is mounted in upper and lower horizontal ways, the former being formed by an undercut guide plate R' secured to the vertical web of the frame B, and the latter being formed by a groove cut in the horizontal web of the said frame. The said slide is reciprocated by means of a lever $r$ that is pivoted between ears on the rear plate of the frame B, the said lever being connected by a link $r'$ with the said slide. An arm $r^2$ is secured to the lever $r$, and at its outer end is provided with a cam roll that is engaged by a cam $r^3$ formed in a cam body mounted upon the cam shaft. The slide R carries a plate $r^4$ that extends transversely to the former arm and which is slotted at its upper edge to receive the former arm when the latter is in its lowest position, the function of the said plate being to strip the shuck off the former arm when the shuck has been completed. This construction is clearly shown in Figs. 4 and 5. Feeder hooks S and S are pivoted to the vertical edges of the plate $r^4$, and extend forward from the said plate, the function of such hooks being to engage the forward edge of the scored blank and move it from the scoring mechanism over the former arm. The said hooks are normally raised by a spring plate $s$ that is secured upon the rear face of the plate $r^4$ and bears upon the rearward edges of downwardly depending arms of the said hooks, as clearly seen in Figs. 4 and 5. The upper edges of the said hooks are downwardly inclined in a forward direction, to enable them to more readily ride under the blanks, and, when the slide R is in its innermost position, the downwardly extending arms of the said hooks engage the front plate of the frame B, and cause the hooks to be depressed, so that the blank may be fed over them in position to be engaged by them.

Upon the under side of the top plate E are formed right and left guide ways $e'$ and $e^2$, respectively, Figs. 1, 4 and 5 which aline with each other, and which are substantially of a width equal to the length of the shuck to be formed. In the right guide way is mounted a folder T, said folder having the end nearest the recess $e$ rounded. Such folder is provided on its under face with an anti-friction roller, which engages a cam $t$ formed in the face of a cam body on the cam shaft, and by which the folder is reciprocated. A left folder bar U is mounted in the left guide way $e^2$, and such folder bar has its end nearest the recess $e$ rounded. The folder bar U is reciprocated in its guide way by the engagement of a cam roll on its under face with a cam N formed in the face of a cam body mounted upon the cam shaft. On the upper side of the folder bar U are formed two transverse slots or grooves $u'$ and $u'$, in which are received holder rods V and V, the latter being connected by a cross head $v$, Fig. 1, that has an anti-friction roller which is engaged by a cam $v'$ formed in the face of the cam body secured upon the cam shaft. The folder bar U is provided with longitudinally extending rectangular recesses $u^2$ and $u^2$ formed in its under face, and with slots $u^3$ and $u^3$ opening through the upper face thereof; and bolts W and W which pass through holes in the top plate E, pass through the said slots $u^3$ and have their rectangular heads situated in the recesses $u^2$. This construction is clearly shown in Figs. 1, 3, 4 and 5. The bolts W and W pass through a cross head $w$, which is supported by a preferably spring lifter bar X, the latter being supported at its right hand end upon the top of the arch of the plate E, and being pivoted at its opposite end to the top of a slide $x$, that is received in a vertical opening in the top plate E, and in a vertical guide way in the left end plate C of the frame. The lower end of the slide $x$ is provided with an anti-friction roller $x^2$, which is acted upon by a cam $x'$ on the driving shaft. The right-hand end of the lifter bar X is rounded, so that said end can rock upon the plate E, as the slide $x$ raises and lowers its left-hand end. The shaft H is driven from the cam shaft by a gear Y, that engages a gear $y$ on the cam shaft; and the shaft G is driven from the shaft H by a pinion $y'$ on the shaft G, that engages a gear $y^2$ on the shaft H.

In the operation of the machine above illustrated, the chute is filled with the blanks from which the shucks are to be formed. The cam shaft is set in operation, and the dogs L and L' are oscillated forward by means of the link $l$ and the cam $l'$. The spring $l^2$ then draws the said dogs rearward, and by means of their saw-toothed upper faces they engage the under face of the lowermost blank and feed it rearward. It will be observed that the feeding movement of the dogs is performed by the spring, and not by the cam, and I thus avoid damage to the machine, and choking the same, in case of difficulty in feeding the blank from the chute. The blank is forced by the dogs against the gate $k^3$, which yields, to allow the lowermost blank to pass beneath it, but prevents the blanks above it from escaping from the chute. The blank enters the right and left guides $n$ and $n'$, and passes between the scoring rolls and disks, where there are formed four scores intermediate its ends; and also passes over the face of the glue wheel, where it receives glue upon the right-hand portion of its under surface. Meanwhile, the slide R has been moved forward by its operating lever and cam, and the hooks S and S have been carried forward and depressed against the action of their elevating spring. When the blank has passed over the hooks S and S, the slide R is moved rearward, carrying the depending arms of the hooks S and S out of contact with the front plate of the frame B, and allowing the hooks to rise in front of and engage the blank and carry it rearward over the horizontal former arm. The former is now raised by means of the lever P, its arm $p$, and the cam operating the latter, an in rising carries its arm having the scored blank upon its upper face into the recess $e$ in the top plate E. The blank is placed over the former arm, so that the two inner scores are directly above the side edges of the former arm, and, consequently, when the said arm rises into the recess $e$, the blank is folded along said scores about the former arm. This leaves a short flap extending downward on the left side of the former, and a long flap extending downward on the right side of the former. The left-hand folder bar U is then advanced, and turns the shorter, unglued flap against the under surface of the former, the holder bars V and V advancing at the same time. The said holder bars then remain stationary, while the folder bar U is withdrawn, the holder bars thus serving to hold the shorter flap, while releasing the folder bar. The right-hand folder bar T is then advanced, and draws the longer flap against the under side of the former arm, and brings its glued portion over the shorter flap of the blank. These steps are illustrated in Figs. 6, 7 and 8 of the drawings. The holder arms are now withdrawn, and a further advance of the folder bar T causes the longer flap to be quickly pressed against the shorter flap, and to adhere thereto. The left-hand folder bar U is then advanced under the overlapping portion of the two flaps of the blank, and while held in such position is pressed, with a heavy pressure, against the said overlapping portions, by the rising of the slide $x$, which elevates the left-hand end of the presser plate X, causing its right-hand end to rock upon the arch of the plate E, and to carry upward the cross head $w$ which, through the bolts W and W, raises the right-hand end of the folder bar U. The described heavy pressure brought to bear upon the overlapping portions of the blank causes the glue to set immediately. The folder bars are then withdrawn, and the former descends, so that its former arm is received within the slot in the plate $r^4$. The slide R is then moved rearward, and by means of the plate $r^4$ strips the now-completed shuck from the former arm, and ejects it from the machine.

The machine above described will produce perfect shucks from a blank formed of such material as card-board, having a highly glazed, or ornamented surface, such as card-board now being used in the packaging of expensive cigarettes, and will produce such shuck without injury to the finish of said surface.

While the above-illustrated machine is the preferred embodiment of my invention, I desire it to be distinctly understood that numerous changes can be made within the scope of my invention, and that such machine is to be regarded merely as an illustration of one embodiment of my invention.

Having thus described my invention, what I claim is:—

1. In a machine for forming box shucks, the combination with scoring mechanism, of folding mechanism in juxtaposition thereto to receive the blanks as the latter leave the scoring mechanism, means associated with said folding mechanism for displacing therefrom the completely-folded blank, and means intermediate the folding and scoring mechanisms and actuated by said displacing means for transferring the blanks from the scoring mechanism to the folding mechanism.

2. In a machine for forming box shucks, the combination with a chute for blanks, of scoring mechanism, folding mechanism in juxtaposition to the scoring mechanism to receive the blanks as the latter leave the scoring mechanism, means for feeding the blanks from said chute to the scoring mechanism, means associated with said folding mechanism for displacing therefrom the completely-folded blank, and means intermediate the folding and scoring mechanisms and carried by said displacing means for transferring the blanks from the scoring mechanism to the folding mechanism.

3. In a machine for forming box shucks, the combination with a chute for blanks, of scoring mechanism, folding mechanism, means acting upon the blanks in the chute for feeding a blank from said chute to said scoring mechanism, means associated with said folding mechanism for displacing therefrom the completely-folded blank, and means intermediate the folding and scoring mechanisms and actuated by said displacing means for transferring the blanks from the scoring mechanism to the folding mechanism.

4. In a machine for forming box shucks, the combination with a chute for blanks, of scoring mechanism, means for feeding a blank from said chute to said scoring mechanism, folding mechanism, and guides extending from the folding mechanism to a point adjacent to the chute and beyond the scoring mechanism, whereby the blank is guided from the chute to the folding mechanism, said guides, scoring mechanism and the bottom of said chute being in coincident planes to permit the blank passing in a horizontal line from the chute to the folding mechanism.

5. In a machine for forming box parts, the combination with a chute for the blanks, and means for feeding a blank from said chute, of folding mechanism to which the blank is delivered including a stationary member and a member movable in relation thereto, hooked bars for supporting the blank in its passage from the chute to the folding mechanism and which engage the blank to present the latter to the folding mechanism, a support for said bars movable in relation to the movable member of the folding mechanism and acting upon the completely-folded blank to displace the same from said movable member, and means for operating the movable parts.

6. In a machine for forming box parts, the combination with a chute for blanks, and means for feeding a blank from said chute, of folding mechanism to which the blank is delivered including a stationary member having a recess formed therein, and a member movable in relation thereto, said movable member being below the recess when opposite the same, hooked bars for supporting the blank in its passage from the chute to the folding mechanism, and which engage the blank to present the latter between the recess and the movable member of the folding mechanism, whereby on the ascent of said movable member the blank will be lifted from said bars, a support for said bars movable in relation to the movable member of the folding mechanism, and acting upon the completely-folded blank to displace the same from said movable member and means for operating the movable parts.

7. In a machine for forming box parts, the combination with a chute for blanks, and means for feeding a blank from said chute, of scoring mechanism, folding mechanism, and means for transferring the blank from said scoring mechanism to said folding mechanism, said means including a support movable in relation to the folding mechanism, hooks pivoted thereto, a spring also carried by said support for yieldingly elevating the points of said hooks above the level of the path of the blank, means for depressing said hooks to allow the blank to pass their points, and means for operating the movable parts.

8. In a machine for forming box shucks, the combination with a chute for blanks, and means for feeding a blank from said chute of scoring mechanism, folding mechanism, a slide reciprocable substantially parallel to the path of the blank, a hook mounted upon said slide, a spring for normally elevating said hook above the path of the blank, a shoulder against which said hook is adapted to abut to depress its point below the path of the blank, and means for operating the movable parts substantially as described.

9. In a machine for forming box shucks, the combination with a chute for blanks, and means for feeding a blank from said chute of a scoring roll, scoring disks below said roll, folding mechanism, a slide movable substantially parallel to the path of the blank, hooks pivoted to said slide, said hooks being movable between the said disks, means for raising and lowering the points of said hooks, and means for operating the movable parts substantially as and for the purpose described.

10. In a machine for forming box shucks, the combination with a former, of a matrix into which said former is movable and into which the latter is adapted to carry a blank having its ends forming free flaps, means for folding the blank upon the former to cause said flaps to overlap, said means being projected across the plane of movement of the former to engage the flaps, and means for holding one of the flaps while the other is being folded thereagainst.

11. In a machine for forming box shucks, the combination with a former, of a matrix into which said former is movable and into which the latter is adapted to carry a blank having its ends forming free flaps, bars for folding the blank upon the former to cause said flaps to overlap, said bars being projected across the plane of movement of the former to engage the flaps, and means for holding one of the flaps while the other is being folded thereagainst.

12. In a machine for forming box shucks, the combination with a matrix, and a former adapted to be received thereby for partly folding a blank about the former, of means for completing the folding of the blank about the former so that portions overlap each other, means acting in the line of movement of the former upon a portion of the folding means to cause the same to press the overlapped portions of the blank to set the adhesive material thereon, and means for stripping the folded blank from the former, said stripping means being timed to act after the adhesive material has been caused to set by the folding means.

13. In a machine for forming box shucks, the combination with a matrix, and a former adapted to be received thereby for partly folding a blank about the former, of bars for completing the folding of the blank about the former so that portions overlap each other, means acting in the line of movement of the former upon a portion of the folding means to cause the same to press the overlapped portions of the blank to set the adhesive material thereon, and means for stripping the folded blank from the former, said stripping means being timed to act after the adhesive material has been caused to set by the folding means.

14. In a machine for forming box shucks, the combination with a matrix, and a former adapted to be received thereby for partly folding a blank about the former, of bars movable across the plane of movement of the former for completing the folding of the blank about the former so that portions overlap each other, means acting in the line of movement of the former upon a portion of the folding means to cause the same to press the overlapped portions of the blank to set the adhesive material thereon, and means for stripping the folded blank from the former, said stripping means being timed to act after the adhesive material has been caused to set by the folding means.

15. In a machine for forming box parts, the combination with a matrix, of a former movable toward and away from said matrix and adapted to partially fold a blank, folders arranged at the sides of said matrix and movable across the path of movement of the former, whereby when the former has become positioned within the matrix the unfolded portions of the blank are caused to overlap, means acting in the line of movement of the former upon one of the folders to cause the same to press the overlapped portions of the blank to set the adhesive material thereon, means associated with the former adapted to strip the folded blank therefrom after the former has been withdrawn from the matrix, and means for operating the former, folders and stripping means.

16. In a machine for forming box parts, the combination with a matrix, of a former movable toward and away from said matrix and adapted to partially fold a blank, folders arranged at the sides of said matrix and movable across the path of movement of the former, said folders being timed to act in succession, whereby when the former has become positioned within the matrix the unfolded portions of the blank are caused to overlap, means acting in the line of movement of the former upon one of the folders to cause the same to press the overlapped portions of the blank to set the adhesive material thereon, means associated with the former adapted to strip the folded blank therefrom after the former has been withdrawn from the matrix, and means for operating the former, folders and stripping means.

17. In a machine for forming box shucks, the combination with a former, of a plate having a recess in which said former is movable, and into which it is adapted to carry a blank, bars mounted upon said plate and movable across the exposed face of the former, means for pressing one of said bars against the former to cause the folded portions to adhere, and means for operating said movable parts.

18. In a machine for forming box shucks, the combination with a former, of a plate having a recess in which said former is movable, and into which it is adapted to carry a blank, folders mounted on said plate and movable across the exposed face of said former from opposite sides of said recess, means for pressing one of said bars against the former to cause the folded portions of the blank to adhere to, and means for operating said movable parts.

19. In a machine for forming box shucks, the combination of a former, a recess into which said former is movable, and into which it is adapted to carry a blank, folders movable across the exposed face of said former when the latter is in the recess, said folders being movable from opposite sides of the recess, a holder for retaining the blank upon the former, also movable across the exposed face of said former to permit the withdrawal of one of said folders, and means for operating the movable parts substantially as described.

20. In a machine for forming shucks, the combination of a former, a plate having a recess into which said former is movable, and into which it is adapted to carry a blank, folders for folding the blank against the exposed face of the former, so that portions thereof overlap, means for forcing one of said folders against said overlapped portions to compress the same against the former, and means for operating the movable parts substantially as and for the purpose described.

21. In a machine for forming shucks, the combination of a former, a plate having a recess into which said former is movable and into which it is adapted to carry a blank, folders mounted upon said plate and movable across said recess from opposite sides thereof, holder bars mounted in slots in one of said folders, said holder bars being movable toward and from said recess independently of said folder, and means for operating the movable parts substantially as and for the purpose described.

22. In a machine for forming shucks, the combination of a former, a plate having a recess into which said former is movable, and into which it is adapted to carry a blank, folders for folding the blank against the exposed face of the former, so that portions thereof overlap, a presser bar bearing against said plate on the opposite side from said recess, a connection between said presser bar and one of said folders, means for moving one end of said presser bar to draw said folder against the former, and means for operating the movable parts substantially as described.

23. In a machine for forming shucks, the combination of a former, a plate having a recess into which said former is movable, and into which it is adapted to carry a blank, folders for folding the blank about said former, so that portions thereof overlap, a presser bar bearing at one end upon said plate, and having means for moving the opposite end toward and away from said plate, a connection between said presser bar and one of said folders to press the latter against the overlapped portions of the blank, and means for operating the movable parts substantially as described.

24. In a machine for forming shucks, the combination of a former, a plate having a recess into which said former is movable, and into which it is adapted to carry a blank, folder bars mounted upon said plate and movable across said recess, on opposite sides thereof, to fold the blank so that portions thereof overlap, a lever bearing at one end upon the side of said plate opposite to said recess, means for moving the other end of the lever, a cross head straddling said lever, bolts secured to the ends of said crosshead, passing through said plate and said folder, and having bearing in countersunk recesses upon the opposite side of said folder from said plate, and means for operating the movable parts, substantially as and for the purpose described.

25. In a machine for forming shucks, the combination of a former, a recess into which said former is movable and into which it is adapted to carry a blank, folders movable across said recess from opposite sides thereof, holder bars movable across said recess from one side thereof, and means for operating the several parts, whereby said former is first moved to carry a blank into said recess, the folder on the side of said recess having the holder bars is moved to fold the adjacent flap of the blank against the former, the opposite folder is moved to fold its adjacent flap against the former, the first folder is withdrawn leaving the holder bars in contact with the first-mentioned flap, the opposite folder is moved to bring said second-mentioned flap over said first-mentioned flap, and the folder adjacent the holder bars is moved over the overlapping portions of said flaps, substantially as described.

26. In a machine for forming shucks, the combination of a former, a recess into which said former is movable and into which it is adapted to carry a blank, folders movable across said recess, from opposite sides thereof, holder bars movable across said recess, from one side thereof, and means for operating the several parts, whereby said former is first moved to carry a blank into said recess, the folder on the side of said recess having the holding bars is moved to fold the adjacent flap of the blank against the former, the opposite folder is moved to fold its adjacent flap against the former, the first folder is withdrawn leaving the holder bars in contact with the first-mentioned flap, the opposite former is moved to bring said second-mentioned flap over said first-mentioned flap, and the folder adjacent the holder bars is moved over the overlapping portions of said flaps, and means for pressing said last-mentioned folder against the former, substantially as and for the purpose described.

27. In a machine for forming shucks, the combination with a matrix, of a former movable relatively thereto and coöperating therewith for partially folding a blank, means movable relatively to said former for completing the folding of the blank, a plate associated with the former and movable longitudinally of the latter for removing the folded blank from the former, and means for operating the movable parts.

28. In a machine for forming shucks, the combination with a former, of means for partially folding a blank about the former, means for causing relative movement between the former and said folding means to effect said partial folding of the blank, means for completing the folding of the blank, a plate associated with the former and provided with a recess to receive said former, and means for moving said plate along said former to strip the folded blank from the former.

29. In a machine for forming shucks, the combination of a former, means above said former, which are adapted to fold a blank about the former, means below the former and movable logitudinally of the latter for stripping the blank off the former, and means for moving said former from one of said means to the other of said means, substantially as described.

30. In a machine for forming shucks, the combination of an elongated former having parallel sides, a slide movable longitudinally of said former, a forked plate carried by said slide, means for folding the blank about said former, means for moving said former into said forked plate, and means for moving said plate longitudinally of said former to strip the shuck off the former, substantially as and for the purpose described.

31. In a machine for forming shucks, the combination of scoring mechanism, a former, a slide movable longitudinally of the former, hooks carried by said slide and extending toward said scoring mechanism, a plate carried by said slide and having a recess by which it is adapted to embrace said former, means for folding the blank about the former, and means for reciprocating said slide, whereby said hooks convey a blank from the scoring mechanism to the former, while said plate strips a shuck off said former, substantially as and for the purpose described.

In testimony that I claim the foregoing I have hereunto set my hand this 14th day of December, A. D. 1901.

JACOB P. WRIGHT.

Witnesses:
EDWIN J. PRINDLE,
HENRY C. HAZARD.

Copies of this patent may be obtained for five cents each, by addressing the "Commissioner of Patents, Washington, D. C."